INVENTORS
AUGUST GUYER,
PASCAL MATILÉ,
ERNST PETERHANS &
WERNER ZOLLINGER

BY

AGENT

United States Patent Office 3,137,724
Patented June 16, 1964

3,137,724
PROCESS FOR THE PRESSURE SYNTHESIS
OF UREA
August Guyer, Zurich, and Pascal Matile, Ernst Peterhans, and Werner Zollinger, Visp, Switzerland, assignors to Lonza Electric and Chemical Works Ltd., Basel, Switzerland, a corporation of Switzerland
Filed Nov. 19, 1956, Ser. No. 622,733
Claims priority, application Switzerland Apr. 16, 1956
8 Claims. (Cl. 260—555)

This invention relates to to the synthesis of urea from ammonia and carbon dioxide at elevated temperatures and pressures. More particularly, it relates to a method for inhibiting corrosion when synthesizing urea in the presence of equipment constructed of nickel-chromium alloy steels.

It is well known that when ammonia and carbon dioxide, or compounds thereof such as ammonium carbonate, bicarbonate, carbamate and the like are subjected to high temperature in a closed system high pressures are generated and urea is formed. For example, urea synthesis has been conducted at pressures of from about 150-400 atmospheres in an autoclave maintained at temperatures of 160°-220° C. During the synthesis reaction the ammonia and carbon dioxide primarily combine exothermically to form ammonium carbamate which at the temperature of reaction is transformed into urea and water. The temperature and pressure of the synthesis reaction are closely linked since the ammonium carbamate first forming must be maintained at least at its saturation pressure in order to prevent its immediate decomposition, and at a temperature approximately corresponding to the saturation value existing for such pressure. It is important that such temperature not be exceeded regardless of the quantity of reaction heat provided or developed.

It is also known that in such an autoclave type synthesis only a part of the carbamate reacts at the prevailing temperature conditions to form urea. The yield of reacting carbon dioxide can, however, be increased to as much as 70% of theoretical or more by employing an excess of ammonia above stoichiometric requirements. It has been suggested to synthesize urea with a large excess ammonia, i.e. 5 to 6 mols of ammonia per mol of carbon dioxide, the excess ammonia then being separated from the reaction mixture and returned to the ammonia feed system. In practice, however, ammonia has been used in excess to the extent wherein the reactant ratio is in the order of 3 mols of ammonia per mol of carbon dioxide.

It is further known that the reaction to form urea can be accelerated by increasing the temperature. The endeavor has therefore been, by the use of high working temperatures and correspondingly high pressures, to increase yields of converted carbon dioxide and reduce reactor size or to increase the reaction mixture rate of through-put. At temperatures exceeding about 180° C., however, the intermediate carbamate melt is extremely corrosive, even where it is in contact with reactor components constructed of highly alloyed chrome-nickel steels. Until recently there has been a misconception that in all instances the presence of oxygen increased the corrosive nature of the carbamate melt.

Accordingly, precautions have been taken in prior procedures to isolate or remove oxygen from the carbon dioxide utilized in the reactant mixture. In U.S. Patents 1,986,973 and 2,129,689 small amounts of a polyvalent metal or metal compound were suggested as a passivating media to be dissolved in the reaction melt.

A further technique suggested for minimizing corrosion caused by reaction mixtures in urea synthesis involved adding negatively charged colloidal particles to the mixture as described in U.S. Patent 1,875,982. With this technique it is also necessary to utilize an oxidation agent in those cases where hydrogen sulphide or the like is present and the corrosion-inhibiting substance supplying the negatively charged colloidal particles does not itself possess oxidizing properties.

In U.S. Patent 2,594,269 it is suggested that oxygen be removed from the carbon dioxide reactant of a urea synthesis mixture through the use of oxidation catalysts such as oxides of manganese and copper to prevent corrosion. In U.S. Patent 2,613,131 compounds having an SH group and an OH group together with an inorganic trivalent arsenic compound are combined in a urea solution to reduce the rate of corrosion of ferrous metals contacted by such solution, while in U.S. Patent 2,680,766 it is alleged that there must be less than 10 p.p.m. of oxygen in the presence of carbon dioxide and ammonia during urea synthesis.

More recently it has been found that the corrosion of high alloy steel, in particular molybdenum-containing types such as austenitic chromium-nickel steel containing 10-18% of Cr, 8-14% of Ni and 1.75-4.00% of Mo, can be substantially completely avoided during urea synthesis by the addition of small amounts of oxygen to the synthesis melt, but only when the temperature of synthesis reaction remains below about 175° C. In U.S. Patent 2,727,069 oxygen additions of 0.1 to 3%, by volume, based on the amount of carbon dioxide utilized, were proposed for urea synthesis at temperatures and pressures of 170-200° C. and 150-200 atmospheres, respectively. When attempting to increase the percent of carbon dioxide conversion and thus the percent of urea formed by the use of excess ammonia at elevated temperatures, particularly above 175° C., it has been noted that addition of 0.1 to 3% of $O_2$, by volume, based on the amount of $CO_2$, does not successfully inhibit corrosion and further results in an increase of turbidity in the synthesis solution and crystallized urea.

It is an object of the present invention to provide novel improvements in minimizing corrosion during the synthesis of urea from ammonia and carbon dioxide.

A further object of the invention is to provide unique improvements which avoid corrosion caused by the normally corrosive carbamate melt formed as an intermediate in urea synthesis as carried out in a stainless steel autoclave.

A still further object of the invention is to minimize corrosion during the synthesis of urea while at the same time increasing the yield of urea by the use of excess ammonia and higher reaction temperatures and pressures.

Another object of this invention is to minimize corrosion caused by the highly corrosive carbamate melt formed as an intermediate in high temperature urea synthesis while at the same time maintaining the turbidity of the solution and/or crystallized urea at an acceptable point.

Other objects and advantages of the invention will be apparent from the following discussion.

According to the present invention, the above objects are realized by the discovery that with excess ammonia (molar ratio of 2.5 to 5 mols of ammonia per mol of carbon dioxide) and reaction temperatures of 190° C. and above as synthesis conditions, less oxygen addition rather than increased amounts of oxygen will substantially completely inhibit corrosion of stainless steel while at the same time provide a product of low turbidity. Specifically it has now been discovered that favorable conditions for urea synthesis are obtained when a mixture of ammonia and carbon dioxide in a ratio of 2.5 to 5 mols of $NH_3$ to 1 mol of $CO_2$ (preferably 4.5:1) is reacted in an autoclave under temperature and pressure conditions of about 196° to 208° C. and 300 to 350 atmospheres respectively, with an oxygen addition in the mixture of between 0.01 to 0.05%, by volume, based on the amount of $CO_2$.

The combination of the above four conditions (mol ratio, temperature, pressure and $O_2$ addition as specified) enables maximum utilization of apparatus volume, very high product yield and a preferably clear solution. The very small addition of oxygen to the reaction mixture as now proposed, is completely sufficient to prevent corrosion and avoid discoloration of the solution by the products of corrosion and in addition greatly reduces inert gas dilution of the entire solution and contamination by solid decomposition products resulting from the presence of oxygen such as colloidal particles which are more difficult to remove than corrosion products.

The requirement of low product turbidity has become increasingly important, particularly in industrial applications where urea is used in combination with other chemicals, for instance with formaldehyde in textile finishing and treating solutions. High turbidity of such solutions destroys the brilliancy of the textile finish.

Where utilizing oxygen addition to accomplish the results heretofore described, it is important that the oxygen be intimately mixed throughout the urea-forming solution and that such solution be continuously in intimate contact with all surfaces of the apparatus. In this regard, dead angles or pockets in the reaction vessel must be avoided. To accomplish intimate contact of reactant solution with reaction apparatus and continuous mixing of reactants within such apparatus, procedures and apparatus such as disclosed in co-pending application Serial No. 622,726, filed November 19, 1956, now abandoned, may be used.

Although it is preferred to use molecular oxygen as the corrosion inhibiting addition, oxygen-forming substances or oxygen-containing substances (such as air) may be used in a manner to provide the above limited quantity of $O_2$. Where such oxygen-forming or -containing substances were used as previously taught, there resulted a substantial increase in the amount of inert gases and decomposition products in the reaction mixture. However, where oxygen is utilized in the reaction melt according to the present invention the quantities thereof are so small that the amount required may be supplied by air without any harmful effect to the reaction solution by increased quantities of inert gases contained therein. Further, under prior practice the amount of inerts in the air tended to lead to the formation of gas pockets whereby continuous contact of the reaction solution with the apparatus surfaces was lost, such surfaces thereby being exposed to corrosion. It should also be noted that without any $O_2$ addition the reaction solution very quickly becomes both turbid and colored. In the present invention inerts including nitrogen in the air are completely disolved in the reaction solution whereby there can be no formation of gas pockets with their ensuing harmful effects.

The invention will now be further described by reference to the accompanying drawing in which.

Figure 1:
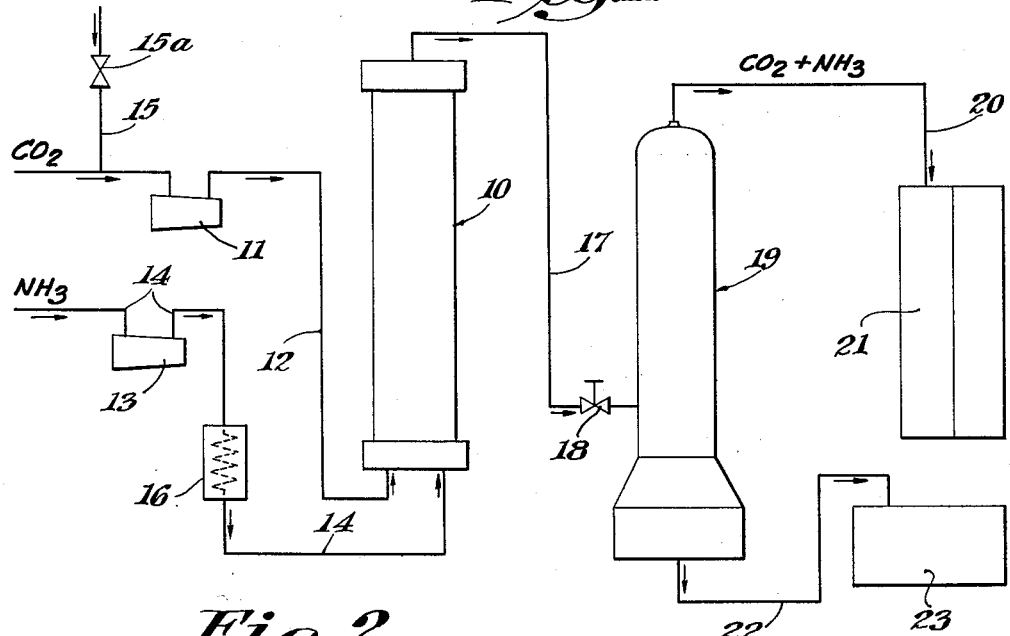
FIGURE 1 shows diagrammatically an installation for urea synthesis according to the invention.

Referring to FIGURE 1, reaction vessel 10 is a high pressure autoclave which receives carbon dioxide from compressor 11 through line 12 and ammonia from compressor 13 through line 14. The ammonia, which may be provided at pressures as high as 320 atmospheres or higher, is supplied in a quantitative ratio with respect to the carbon dioxide supplied such that for one mol of $CO_2$ there are from 2.5 to 5 mols of $NH_3$ (preferably 4.5 mols of $NH_3$). Prior to compression the carbon dioxide stream in line 12 receives a small quantity of oxygen, air or other suitable oxygen-containing or -forming gas which may be provided through line 15 and valve 15a. As previously mentioned the quantity of oxygen addition should be about 0.01 to 0.05% oxygen or about 0.05 to 0.25% air based upon the amount of carbon dioxide. Where air is used as the corrosion inhibitor the nitrogen becomes dissolved in the reaction mixture.

The ammonia in line 14 is preheated in heat exchanger 16 prior to compression. Such preheating, which may be to from about 30°–120° C., provides the major control factor for the urea synthesis reaction whereby, with the exothermic heat of reaction, an equilibrium temperature of about 198°–202° C. may be accurately maintained. In practice, when synthesizing urea under the above conditions, yields of combined $CO_2$ of 77% of theoretical and higher have been attained. The $CO_2$ combines to form ammonium carbamate and thence urea and water forming a solution which also contains uncombined reactants. Such reaction mixture containing urea leaves autoclave 10 through line 17 and reducing valve 18 and is introduced into separator 19 wherein uncombined $CO_2$ and excess $NH_3$ are extracted and removed through line 20 to be separated in separator 21. The urea solution leaving separator 19 through line 22 may be passed to a crystallizer 23 or other purifying or processing apparatus.

Since the oxygen or air is added to the carbon dioxide prior to compression in compressor 11, it becomes exceedingly uniformly distributed throughout the $CO_2$ prior to admixture with the $NH_3$. The latter is then suitably combined in the autoclave with the preheated $NH_3$.

Figure 2:
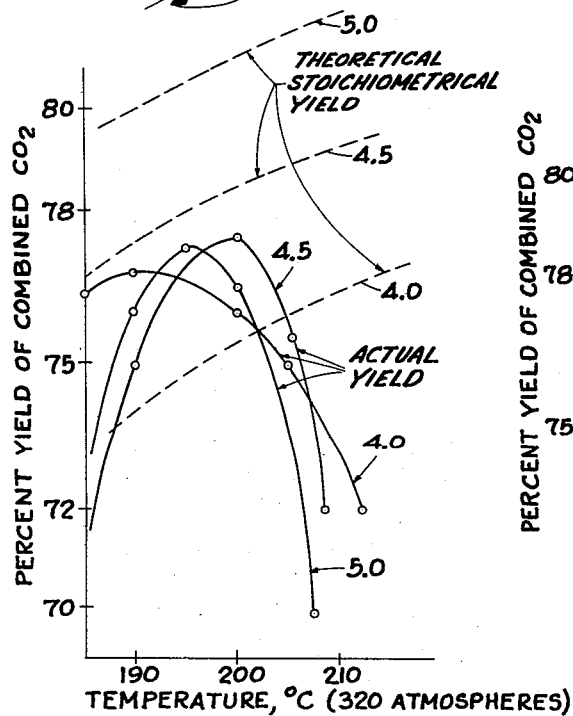
FIGURE 2 is a graphic representation of the percent of theoretical stoichiometric yield for three reactant mixture ratios (mols of $NH_3$ per mol of $CO_2$) with respect to autoclave temperatures.

FIGURE 2 shows the relationship of theoretical and actual yields of combined carbon dioxide (ordinate) for several reactant mixture ratios (mols of ammonia per mol of carbon dioxide) over a normal urea synthesis temperature range (abscissa) for pressure synthesis at an autogenous pressure of about 320 atmospheres. It will be noted that the actual curves fall steeply on both sides of maximum, the most favorable maximum being obtained with a molar ratio of 4.5 mols of ammonia to 1 mol of carbon dioxide.

Figure 3:
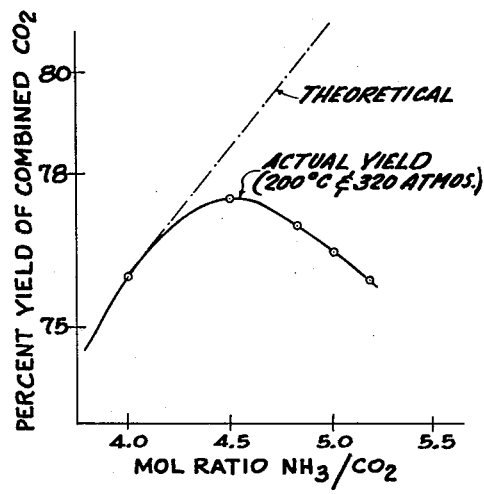
FIGURE 3 is a graphic representation of the percent of theoretical stoichiometric yield for various reactant mixture ratios (mols of $NH_3$ per mol of $CO_2$) for a given temperature and pressure condition.

FIGURE 3 shows the relationship of theoretical and actual yield of combined carbon dioxide (ordinate) for several reactant mixture ratios (mols of ammonia per mol of carbon dioxide) (abscissa) for pressure synthesis at a temperature of 200° C. and an autogenous pressure of about 320 atmospheres. It will be noted that the maximum yield is obtained at a mixture ratio of about 4.5 mols of $NH_3$ to 1 mol of carbon dioxide.

While the manner of application of the invention can be varied widely, particularly as regards to specific operating pressures and temperatures, the following examples will serve to illustrate how the practice of the present invention has produced exceptional results in preventing corrosion during urea synthesis with respect to prior known methods. To facilitate comparison of the effect of varying the oxygen addition upon turbidity, the examples have been placed in tabular form. The description of procedure according to Example 1 may be applied to Examples 2 and 3.

| Example No. | Reactor Temp., °C. | Oxygen Addition, Percent based upon $CO_2$ (by volume) | Turbidity (APHA Std.), p.p.m. | |
| --- | --- | --- | --- | --- |
| | | | Urea Solution, measured at 45% Urea | Urea Crystals, measured at 33% Urea |
| 1 | 200 | 0.01–0.05 | 20–40 | 10–20 |
| 2 | 200 | 0.10–0.20 | 150–180 | 70–80 |
| 3 | 193 | 0.05–0.10 | 70–100 | 40–50 |

In an apparatus for the synthesis of urea, constructed of stainless steel (austenitic chromium-nickel steel containing 16–18% of Cr, 8–14% of Ni, and 2.0–2.5% of Mo), urea was prepared from $NH_3$ and $CO_2$ (mol ratio of 4.5 to 1). During the carbamate synthesis the temperature was maintained at 200° C. and the pressure at 300 atmospheres. To the $CO_2$, prior to compression, 0.01 to 0.05% of molecular oxygen was added. The turbidity of the synthesized urea was measured according to APHA Standards both in solution and in crystal form and was found to be 20–40 p.p.m. and 10–20 p.p.m., respectively.

At the same synthesis temperature (Example 2) there occurred a sharp increase in turbidity when the oxygen addition was increased to over 0.05%. Likewise at lower synthesis temperatures (Example 3) relatively high turbidity was noted with oxygen additions of greater than about 0.05%.

The above representatives examples, taken from exhaustive investigations to determine maximum yields of urea without accompanying corrosiion action, will clearly indicate that where increased conversion is desired (obtained by synthesis in the presence of excess ammonia) relatively high temperatures are necessary (increases corrosive action) and oxygen is necessary as a corrosion inhibitor. However, turbidity, which is a function of conversion and the presence of oxygen, increases rapidly with higher temperatures (necessary for high conversion) and must therefore be controlled by the amount of oxygen addition (necessary to inhibit corrosion). By the addition of oxygen in the amount of 0.01 to 0.05%, by volume, based upon the amount of $CO_2$ utilized, a product is obtained which has a low turbidity index and is free of compounds formed by corrosive action within the synthesis apparatus.

It will be appreciated that various modifications may be made in the invention described above without deviating from the scope thereof as defined in the appended claims.

We claim:

1. In the art of synthesizing urea from ammonia and carbon dioxide at urea forming temperatures and pressures while utilizing an excess of ammonia in the reaction mixture over stoichiometrical requirements in apparatus having chromium-nickel steel surfaces exposed to the synthesis reactants and reaction conditions and wherein a normally corrosive carbamate melt is obtained as an intermediate product, the improved method of conducting said synthesis whereby the corrosive effect of said melt is substantially inhibited and the turbidity of the product urea is minimized: comprising effecting said synthesis at a urea forming temperature above 190° C. and at a urea forming pressure of between 300 and 350 atmospheres in the presence of from 0.01 to 0.05%, by volume, of oxygen based on the amount of carbon dioxide utilized.

2. In the art of synthesizing urea from ammonia and carbon dioxide at urea forming temperatures and pressures while utilizing an excess of ammonia in the reaction mixture of about 25% to about 150% over the stoichiometrical requirements in apparatus having chromium-nickel steel surfaces exposed to the synthesis reactants and reaction conditions and wherein a normally corrosive carbamate melt is obtained as an intermediate product, the improved method of conducting said synthesis whereby the corrosive effect of said melt is substantially inhibited and the turbidity of the product urea is minimized: comprising effecting said synthesis at a urea forming temperature above 190° C. and at a urea forming pressure of between 300 and 350 atmospheres in the presence of an oxygen containing gas the oxygen content of which is from 0.01 to 0.05%, by volume, based on the amount of carbon dioxide utilized.

3. The method as claimed in claim 2 wherein the excess of ammonia in the reaction mixture is about 125% over the stoichiometrical requirements.

4. The method as claimed in claim 2 wherein the oxygen containing gas is mixed with the carbon dioxide reactant prior to introduction of said reactant into the synthesis apparatus.

5. In the art of synthesizing urea from ammonia and carbon dioxide at urea forming temperatures and pressures while utilizing an excess of ammonia in the reaction mixture of about 25% to about 150% over the stoichiometrical requirements comprising conducting said synthesis in a chromium-nickel steel reaction vessel having internal surfaces exposed to the synthesis reactants and reaction conditions and wherein a normally corrosive carbamate melt is obtained as an intermediate product, the improved method of conducting said synthesis whereby the corrosive effect of said melt is substantially inhibited and the turbidity of the product urea is minimized: comprising intimately mixing an oxygen containing gas with the carbon dioxide reactant prior to introduction of said reactant into said reaction vessel, the oxygen content of said gas being in an amount of from 0.01 to 0.05%, by volume, of the amount of carbon dioxide utilized for said synthesis; immediately introducing said reactants into said reaction vessel; and effecting said synthesis at a urea forming temperature above 190° C. and at a urea forming pressure of between 300 and 350 atmospheres while continuously and intimately mixing said reactants and intermediate reaction products during their passage through said vessel whereby the reaction mixture is continuously maintained in flowing contact with said internal surfaces of said vessel.

6. In the art of synthesizing urea from ammonia and carbon dioxide at urea forming temperatures and pressures while utilizing an excess of ammonia in the reaction mixture of about 25% to about 150% over the stoichiometrical requirements in apparatus having chromium-nickel steel surfaces exposed to the synthesis reactants and reaction conditions and wherein a normally corrosive carbamate melt is obtained as an intermediate product, the improved method of conducting said synthesis whereby the corrosive effect of said melt is substantially inhibited and the turbidity of the product urea is minimized: comprising effecting said synthesis at a urea forming temperature of between 196 and 208° C. and at a urea forming pressure of between 300 and 350 atmospheres in the presence of an oxygen containing gas the oxygen content of which is from 0.01 to 0.05%, by volume, based on the amount of carbon dioxide utilized.

7. The method as claimed in claim 6 wherein the excess of ammonia in the reaction mixture is about 125% over the stoichiometrical requirements.

8. In the synthesis of pure urea by the reaction of carbon dioxide and a stoichiometric excess of ammonia at elevated pressures and temperatures in apparatus having stainless steel surfaces exposed to the reaction medium, the step of decreasing the corrosive effect of said medium and the turbidity of the product urea by introducing oxygen gas into said reaction with said reactants in an amount equal to 0.01% to 0.05% by volume on the amount of carbon dioxide introduced.

References Cited in the file of this patent

UNITED STATES PATENTS

| | | |
|---|---|---|
| 1,659,190 | Bub | Feb. 14, 1928 |
| 2,046,827 | Lawrence et al. | July 7, 1936 |
| 2,680,766 | De Ropp et al. | June 8, 1954 |
| 2,727,069 | Van Waes | Dec. 13, 1955 |